US007864932B2

(12) United States Patent
Lee et al.

(10) Patent No.: US 7,864,932 B2
(45) Date of Patent: Jan. 4, 2011

(54) DIGITAL TELEPHONE SWITCH

(75) Inventors: John Lee, Whitby (CA); Luc Matteau, Peterborough (CA)

(73) Assignee: ATX Networks Inc., Ajax, Ontario (CA)

( * ) Notice: Subject to any disclaimer, the term of this patent is extended or adjusted under 35 U.S.C. 154(b) by 1310 days.

(21) Appl. No.: 11/396,904

(22) Filed: Apr. 4, 2006

(65) Prior Publication Data

US 2006/0239435 A1 Oct. 26, 2006

Related U.S. Application Data

(60) Provisional application No. 60/671,490, filed on Apr. 15, 2005.

(51) Int. Cl.
*H04M 11/00* (2006.01)

(52) U.S. Cl. ............ 379/93.09; 379/90.01; 379/207.02

(58) Field of Classification Search ............. 379/93.09, 379/90.01, 93.05, 93.06, 207.02, 207.04, 379/207.06, 219, 212.01, 221.13, 333, 336
See application file for complete search history.

(56) References Cited

U.S. PATENT DOCUMENTS 4,355,198 A * 10/1982 Gartland, Jr. ................. 174/66
6,160,880 A * 12/2000 Allen .................... 379/221.13
6,393,104 B1 * 5/2002 Akhteruzzaman et al. ..... 379/37
2004/0192292 A1 * 9/2004 Chang et al. ............. 455/426.1
2004/0223604 A1 * 11/2004 Kieren ....................... 379/327
2005/0074110 A1 * 4/2005 Moreman ............. 379/212.01
2005/0117734 A1 * 6/2005 Higgins ................ 379/221.13

* cited by examiner

*Primary Examiner*—Melur Ramakrishnaiah
(74) *Attorney, Agent, or Firm*—Brinks Hofer Gilson & Lione

(57) ABSTRACT

A digital telephone switch allows transparent switching from a convention telephone service to a cable digital telephone service. The switch is connected to the customer premises equipment and to the old and new telephone services. In its initial state, the switch connects the customer premises equipment to the old telephone service, leaving the new telephone service disconnected. Once a ring is detected on the new telephone service, or another appropriate control signal is received, the switch disconnects the customer premises equipment from the old telephone service and connects the customer premises equipment to the new telephone service. One embodiment can switch back and forth between the old and new telephone services to accommodate intercoms and the like.

36 Claims, 11 Drawing Sheets

248
CPE Wiring
100
108
232
212
222
250
214
224
MTA
216
226
218
228
234
POTS Cross Connect
204
Local Telephone
246
106
202
208
206
240
9V Reset
242
104

DIGITAL TELEPHONE SWITCH

REFERENCE TO RELATED APPLICATION

The present application claims the benefit of U.S. Provisional Patent Application No. 60/671,490, filed Apr. 15, 2005, whose disclosure is hereby incorporated by reference in its entirety into the present disclosure.

FIELD OF THE INVENTION

The present invention is directed to a digital telephone switch and more particularly to a switch which allows a smooth and automatic switchover from an Incumbent Local Telephony Provider provided telephony service (ILEC) to a Multiple Service Operator (MSO) provided service. Further, in some applications the switchover could be made back and forth between the ILEC service and the MSO service. Further, in some applications the switchover could be made back and forth between another telephony service (eg. non-subscriber loop (NSL) based) and the MSO service.

DESCRIPTION OF RELATED ART

Cable television companies (MSOs), seeking to compete for telephone customers with incumbent local telephone companies, are marketing digital cable telephone services. As a result of the Telecommunications Act of 1996, consumers who choose to purchase MSO provided telephony services have the right to maintain their incumbent telephone number. In this case, the ILEC is required to transfer the phone number to the MSO. This process is referred to as Local Number Portability, and the ILECs are required by law to port the consumer's number to the MSO within a set time period; however the time can vary for any given port. In a typical cable telephone installation, a multimedia terminal adapter (MTA) is installed at the customer's premises to provide an interface between the cable network and the customer's telephony wiring.

The MTA must be installed at the customer's premise, connected to the cable network and connected to the customer's telephony wiring. Further, the ILEC must be disconnected from customer premise telephony wiring. In order for an MSO to coordinate the hardware installation requirements with the local number portability requirement as well as ensure that the customer who is having their number ported to the MSO is never without phone service, considerable logistics are required for a cost effective installation. Installations of MSO supplied telephony services in multi-dwelling units (MDUs) provide further challenges. In many cases, MDUs are provisioned with Non Subscriber Loop (NSL) switched based intercom systems that provide connectivity between a front lobby telephone and a telephone in a given apartment unit in the MDU. In traditional NSL based applications, in order to accommodate this type of connectivity, an NSL switch switches the front lobby phone onto the given apartment's telephony wiring and at the same time switches the ILEC's telephony service off of the telephony wiring of the same apartment. Once the front lobby interaction is complete, the front lobby phone is switched off of the apartment's telephony wiring, and the ILEC telephony service is switched back on to it. Hence, the NSL Intercom switch has a dedicated input connection from the ILEC provided telephony service for each apartment in the MDU and an input from the front lobby telephone(s). There is an NSL output for each apartment in the MDU and these are directly connected to the telephony wiring of the respective apartments. The NSL is typically located close to the incoming ILEC telephony wiring, which typically enters an MDU in a single centralized location (eg. Basement).

MSOs provide telephony service by installing an MTA in the apartment. Hence, the telephony service provided by an MSO within an MDU is distributed. In order for an MSO to install their telephony service and accommodate an NSL Intercom solution they would have to disconnect the ILEC service at the input of the NSL switch, "back feed" the MTA's telephony output out of the apartment and connect it to the input of NSL unit. Typically, it is very time consuming for the MSO's technician to find the suitable connections in order to implement the "back feeding" process.

SUMMARY OF THE INVENTION

There thus exists a need in the art to make the installation of a cable telephone system more convenient and less disruptive for the customer.

It is therefore an object of the invention to simplify the switch-over of the CPE from the ILEC to the MTA.

It is another object of the invention to reduce or even eliminate the down time during which the switch-over occurs.

It is still another object of the invention to provide an option to configure the CPE for connection to the MTA before the MTA is properly provisioned to operate. In this case the MTA may still need to be provisioned with the phone number that needs to be ported from the ILEC.

It is yet another object of the invention to provide a general solution which can be adapted to any switch-over from one telephone system to another.

To achieve the above and other objects, the present invention is directed to a digital telephone switch which has connection points for the CPE and first and second telephone systems (such as the ILEC and the cable telephone system via the MTA). The digital telephone switch includes a switch which, in its default state, connects the CPE to the first telephone system and leaves the CPE disconnected from the second telephone system. When the digital telephone switch detects a ring on the second telephone system, the digital telephone switch knows that the second telephone system is active. It then switches the switch to connect the CPE with the second telephone system, thereby disconnecting the CPE from the first telephone system.

The switch can have a reset feature to reset the switch to its original position. Such a reset feature should be difficult to actuate accidentally. In one example of such a reset feature, a 9V battery is connected between two reset terminals.

The digital telephone switch is used as follows. The switch is connected between the CPE and the ILEC at any time before the switch-over. When the MTA is installed at the customer's premises, the MTA is connected to the appropriate port. When the MTA is activated, the first incoming call causes a ring signal to be applied to the digital telephone switch, at which time the digital telephone switch flips the switch to connect the CPE with the MTA. The ILEC is then disconnected.

The present invention offers the following advantages. A single-shot switch, triggered by the initial ring of the MTA, switches the customer's telephone service from the ILEC to the MTA. The switch allows an operator to install the CPE without having to coordinate the installation with the back office staff, thereby allowing the MTA to be installed at a later date. The switch minimizes the likelihood of false triggering by noise picked up on UTP (unshielded twisted pair) wiring. The switch can be provided in various form factors, including a wall or table mount unit provisioned with RJ 11 ports, and outdoor unit provisioned with IDC connectors or in a wall plate format provisioned with appropriately configured RJ 11 ports and wire connection point terminals. A preferred embodiment has standard RJ11 jacks for connection to the CPE, the ILEC, and the MTA. In embodiments having the reset functionality, that functionality allows redeployment of the switch to other locations once the switch has outlived its usefulness at a single location.

By installing a switch device that can automatically and simultaneously switch in the MSO provided phone service/switch out the ILEC service to/from the customer premise telephony wiring once the porting process is completed, considerable operational efficiencies (and hence economic savings) can be achieved. Further, it is ensured that the customer never experiences a disruption in their telephony service.

Another embodiment allows back-and-forth switching between the ILEC and the MTA. Such an embodiment would be useful in multidwelling units (MDUs) which are configured with NSL based intercom systems. NSL systems are designed to work in conjunction with ILEC telephony service and switch the apartment premise wiring between the ILEC telephone service and the front lobby telephone service on an as required basis. Typically, the ILEC service and the front lobby phone service are connected to the input side of the NSL device (generally located in the MDU basement, where each ILEC service for each apartment enters the MDU) and the output side of the NSL feeds the apartments (generally through riser cables) in the MDUs. In the case of the MSO, accommodating NSL intercom functionality to the apartment becomes difficult due to the fact that in the case of the MSO provided phone service, the service is provided into the apartment by means of an MTA (multimedia terminal adapter) that is itself located in the apartment. In order to accommodate NSL type functionality the MSO phone service must replace the corresponding ILEC phone service at the input of the NSL device. Since these devices are generally not located in the same location, the MSO must back feed the MTA output from the apartment to the front of the NSL device. This would typically involve finding an unused twisted pair in the riser cable (bundle of twisted pairs) so that the MTA output could be connected to it. This can be very time consuming and uneconomical.

To reduce the inefficiencies and economic hardship required by MSOs in order to provide their telephony service as well as accommodate NSL intercom functionality to all telephones in the apartment, the "intercom" embodiment, which allows back-and-forth switching between the NSL ILEC/Intercom telephone service and the MTA telephone service, can be used. When a user's telephone is connected to the MTA and a call over the ILEC/Intercom line is detected, the "intercom" embodiment switches the user's telephone equipment back to the ILEC/Intercom line to allow the apartment user to address the call from the front lobby. Once the switch detects that either the user or the visitor has hung up, the switch switches the user's telephone equipment back to the MTA.

If the call over the ILEC/Intercom line is detected while the user is on an MTA call, the switch generates a call-waiting beep to allow the user to take the ILEC/Intercom call. During the ILEC/Intercom call, the impedance of the connection to the MTA is maintained such that the MTA call is kept on hold rather than disconnected.

Also, when the switch according to the second preferred "intercom" embodiment detects that the power to the MTA has been lost or the MTA has been disconnected, the switch switches the user's telephone equipment back to the ILEC. Thus, the switch can easily accommodate power failures and the like.

If a switch device is placed in the apartment that will switch the connection of the apartment's telephony wiring between the incoming NSL based telephony signals and the MSO provided telephony signal, the "back feed" requirement can be eliminated, and operational efficiencies can be maintained. In order to ensure that the apartment is always provisioned with telephony service provided by the MSO, this switch must ensure that the apartment telephony wiring is always connected to the MSO provided service as a default. The only time the switch connects the NSL provided service to the apartment wiring is when a) the NSL service is ringing and the apartment telephone is on the hook or b) the apartment resident decides to "flash" over to the NSL service while on a call through the MSO provided service.

If the MTA power is removed and/or the MTA connection to the device is removed, the Intercom unit will switch back to the Telco/Intercom side. However, if the MTA power is restored or the MTA is plugged back into the MTA port on the Intercom device, it will switch back to the MTA service. Thus, in apartments where there is a high turnover rate of tenants, phone service can easily be provided from the ILEC or the MSO. When a tenant moves out, that tenant can take the MTA device out of the apartment, and the Intercom unit will switch back to the Telco/Intercom side. The next tenant can move in and either obtain phone service from the ILEC without the ILEC having to roll a truck or obtain MSO Digital Voice Service by plugging a new MTA into the MTA port of the Intercom unit. The MSO can thus save money by accommodating customer self installation of the MTA.

The present invention, including both preferred embodiments, offers an advantage in accommodating local number portability (LNP). Once a user's telephone number is transferred from the ILEC to the new telephone service, telephone calls start to come in over the MTA rather than the ILEC, thereby triggering the switch. Accordingly, the user does not have to remember when the number transfer is supposed to take place in order to disconnect and reconnect telephone equipment; instead, the transition happens transparently to the user.

Modifications of either or both of the preferred embodiments are possible. An outdoor version of either embodiment can be implemented, with a hardened design that allows installation in a telephone company's NID (network interface device), a CATV enclosure, or a stand-alone installation. Of course, the connectors on the unit can be adapted accordingly. Either of the embodiments can be incorporated into a wall plate to allow cleanliness of installation; that modification is basically concerned with different packaging. A switch can switch back and forth between the ILEC (incumbent local exchange carrier) and the MTA according to whether the incoming ring signal is from the MTA side or the ILEC side. Such a switch can be further modified such that the operator can remotely lock the switch position to the MTA position. Remote control can be performed by tone recognition (for example, a caller can enter a specific sequence of numbers), by caller ID, or a combination of the two.

The switch does not even have to be a separate unit at all. It can be incorporated into an MTA or a cable modem. For example, a manufacturer of cable modems that produces a cable modem with an EMTA (embedded MTA) can also embed the switch into the cable modem.

BRIEF DESCRIPTION OF THE DRAWINGS

Two preferred embodiments of the present invention will be set forth in detail with reference to the drawings, in which.

DETAILED DESCRIPTION OF THE PREFERRED EMBODIMENT

Figure 1:
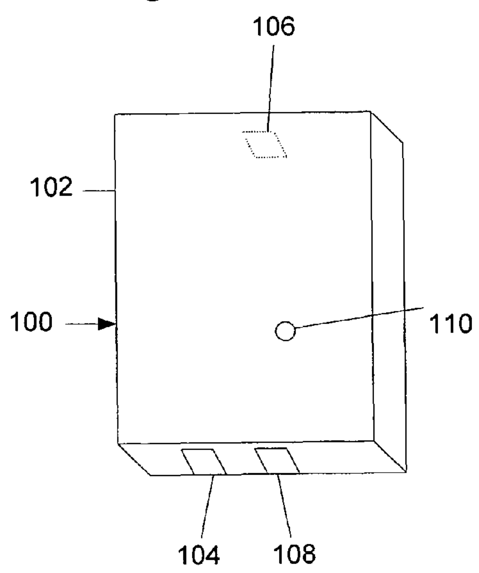
FIG. 1 is an external view showing the digital telephone switch of the first preferred embodiment.

Two preferred embodiments will be described in detail with reference to the drawings, in which like reference numerals refer to like elements throughout.

FIG. 1 is an external view of the digital telephone switch 100 according to the first preferred embodiment. The digital telephone switch 100 has a case 102 with a port 104 for a telephone, a port 106 to be connected to both the ILEC and the CPE (customer premises equipment) in a manner to be explained below, and a port 108 for the MTA. The ports 104, 106 and 108 are configured as standard RJ11 jacks. However, other connections could be used as needed. For example, in an outdoor unit for installation in a NID or the like, IDC type connections could be used. Similarly, in a unit configured as a wall plate, a combination of RJ11 and IDC or wire terminal type connections could be used. An LED 110 indicates the status of the digital telephone switch 100 in a manner to be explained below.

Figure 2:
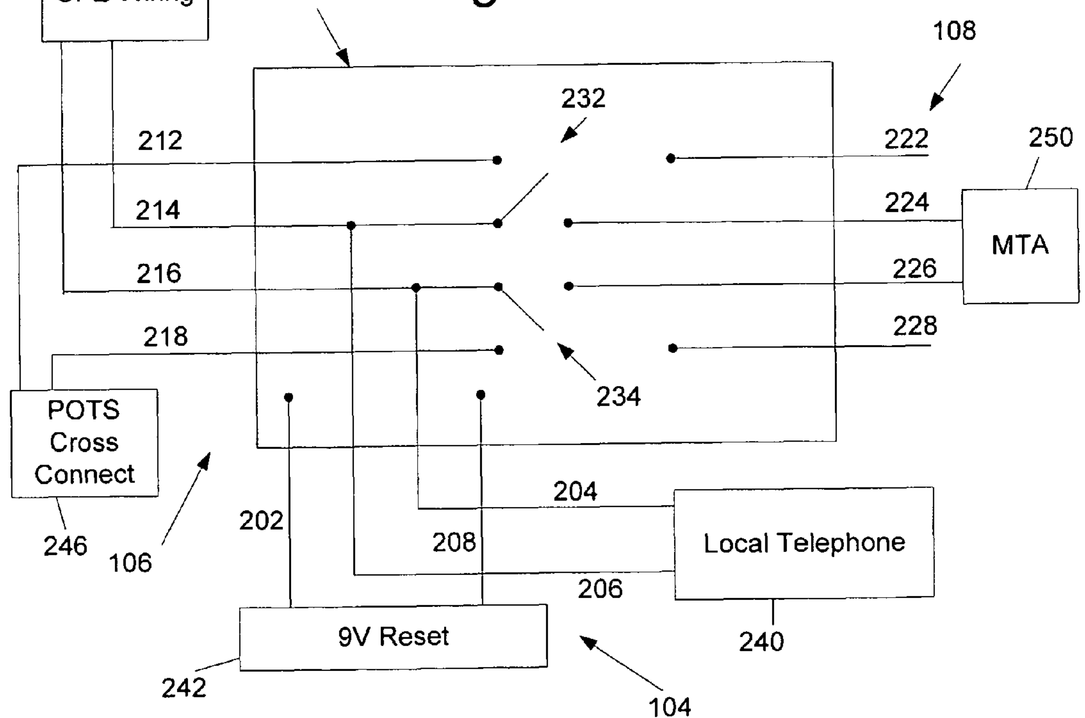
FIG. 2 is a functional schematic diagram showing the switching configuration of the digital telephone switch of the first preferred embodiment.

FIG. 2 shows a functional schematic diagram of the digital telephone switch 100. It is well known in the art that a standard telephone interface includes up to four lines, which are color coded black, read, green and yellow. The port 104 includes a black line 202, a red line 204, a green line 206, and a yellow line 208. The port 106 includes a black line 212, a red line 214, a green line 216, and a yellow line 218. The port 108 includes a black line 222, a red line 224, a green line 226, and a yellow line 228. The read and green lines 204, 206 of the port 104 are connected to the red and green lines 214, 216 of the port 106.

A switching element 232 selectively connects the red line 214 of the port 106 to either the black line 212 of the port 106 or the red line 224 of the port 108. A switching element 234 selectively connects the green line of the port 106 to either the yellow line 218 of the port 106 or the green line of the port 108. The switching elements can be implemented in any suitable way, e.g., mechanical switches.

The ports 104, 106 and 108 are connected as follows. For the port 104, the red and green lines 204, 206 are connected to the ring and tip lines, respectively, of a local telephone 240. The black and yellow lines 202, 208 are normally unconnected, but can be connected to a nine-volt battery 242 to reset the digital telephone switch 100. For the port 106, the black and yellow lines 212, 218 are connected to an ILEC cross connection 246, which will be explained below with reference to FIG. 3. The read and green lines 224, 226 are connected to customer premises wiring 248. For the port 108, the read and green lines 224, 226 are connected to an MTA cable modem 250, while the black and yellow lines 222, 228 are unconnected.

The switching elements 232 and 234, in their default positions, connect the red lines 204, 214 to the black line 212 and the green lines 206, 216 to the yellow line 218, thus connecting the local telephone 240 and the customer premises wiring 248 to the ILEC cross connection 246. When switched over, the switching elements connect the red lines 204, 214 to the red line 224 and the green lines 206, 216 to the green line 226, thus connecting the local telephone 240 and the customer premises wiring 248 to the MTA cable modem 250.

Figure 3:
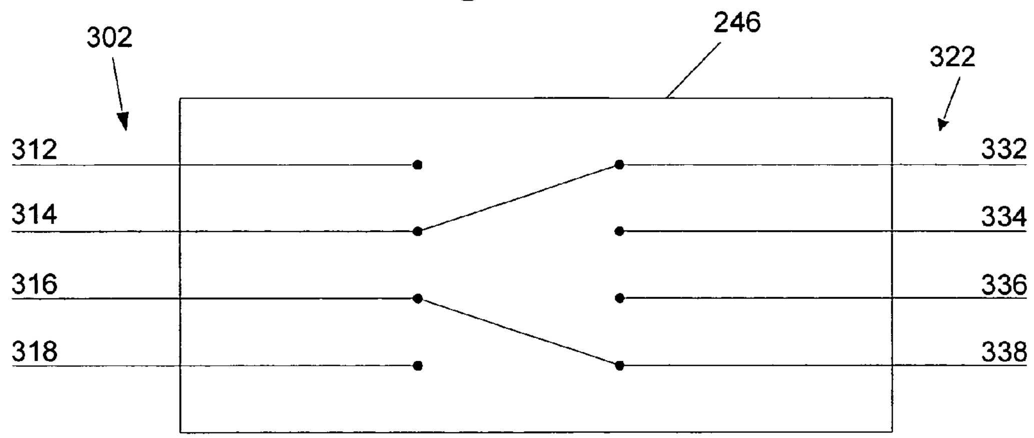
FIG. 3 is a functional schematic diagram showing the cross connect requirements at the telephone company demarcation point according to the first preferred embodiment.

The ILEC cross connection 246 has the configuration shown in FIG. 3. The incoming ILEC line 302 includes a black line 312, a red line 314, a green line 316 and a yellow line 318, while the outgoing cross-connected line 322 includes a black line 332, a red line 334, a green line 336 and a yellow line 338. In the incoming ILEC line 302, the red and green lines 314, 316 are used as a ring line and a tip line, respectively, while the black and yellow lines 312 and 318 are not connected. In the cross connection 246, the red and green lines 314 and 316 are connected to the black and yellow lines 332 and 338 of the outgoing cross-connected line 322, while the red and green lines 334, 336 of the cross-connected line 322 are unconnected.

Figure 4:
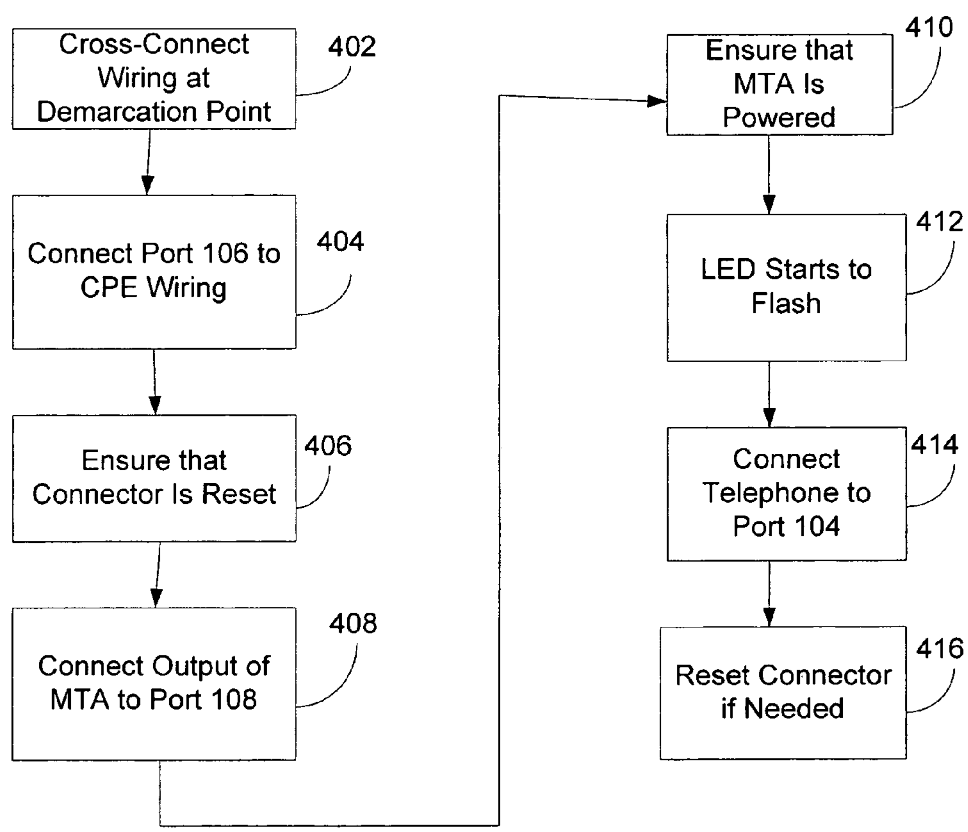
FIG. 4 is a flow chart showing a method in which the digital telephone switch of FIGS. 1 and 2 is installed and used.

The digital telephone switch 100 is connected in the following manner, as shown in the flow chart of FIG. 4.

Step 402. Cross-connect the wiring at the telephone company demarcation point, i.e., the point where the ILEC wiring enters the customer's premises. That is done as explained above with reference to FIG. 3.

Step 404. Connect the port 106 of the digital telephone switch 100 to customer premise wiring 248. That may be done with any RJ11 jack in the customer premises. However, it must be done with a UTP cable which is four-wire and not cross-connected, so that both the ILEC cross connection 246 and the customer premises wiring 248 are connected.

Step 406. Ensure that the digital telephone switch is reset. If the digital telephone switch needs to be reset, see step 416 below.

Step 408. Connect the output of the MTA 250 to the port 108 on the digital telephone switch. The UTP wiring need not be four-wire, but it must not be cross-connected.

Step 410. Ensure that the MTA is powered. That is done in accordance with the instructions for the MTA, not for the digital telephone switch.

Step 412. After approximately 30 seconds, the LED 110 starts to flash, indicating that the MTA 250 is connected and that the digital telephone switch 100 is ready for operation. Of course, that time period is a matter of design choice.

Step 414. If desired, connect a telephone to the port 104 of the digital telephone switch 100.

Step 416. If it is, or ever becomes, necessary to reset the digital telephone switch 100, apply a nine-volt battery or other nine-volt DC source across the black and yellow lines 202, 208 of the port 104.

When the switching elements 232, 234 are in their initial positions, the CPE will be connected to the POST cross connection, and the MTA will not be connected to the CPE. Once an incoming ring from the MTA is detected, the switching elements 232, 234 will switch over. Thus, the CPE will be disconnected from the ILEC cross connection 246 and connected to the MTA 250.

Figure 5:
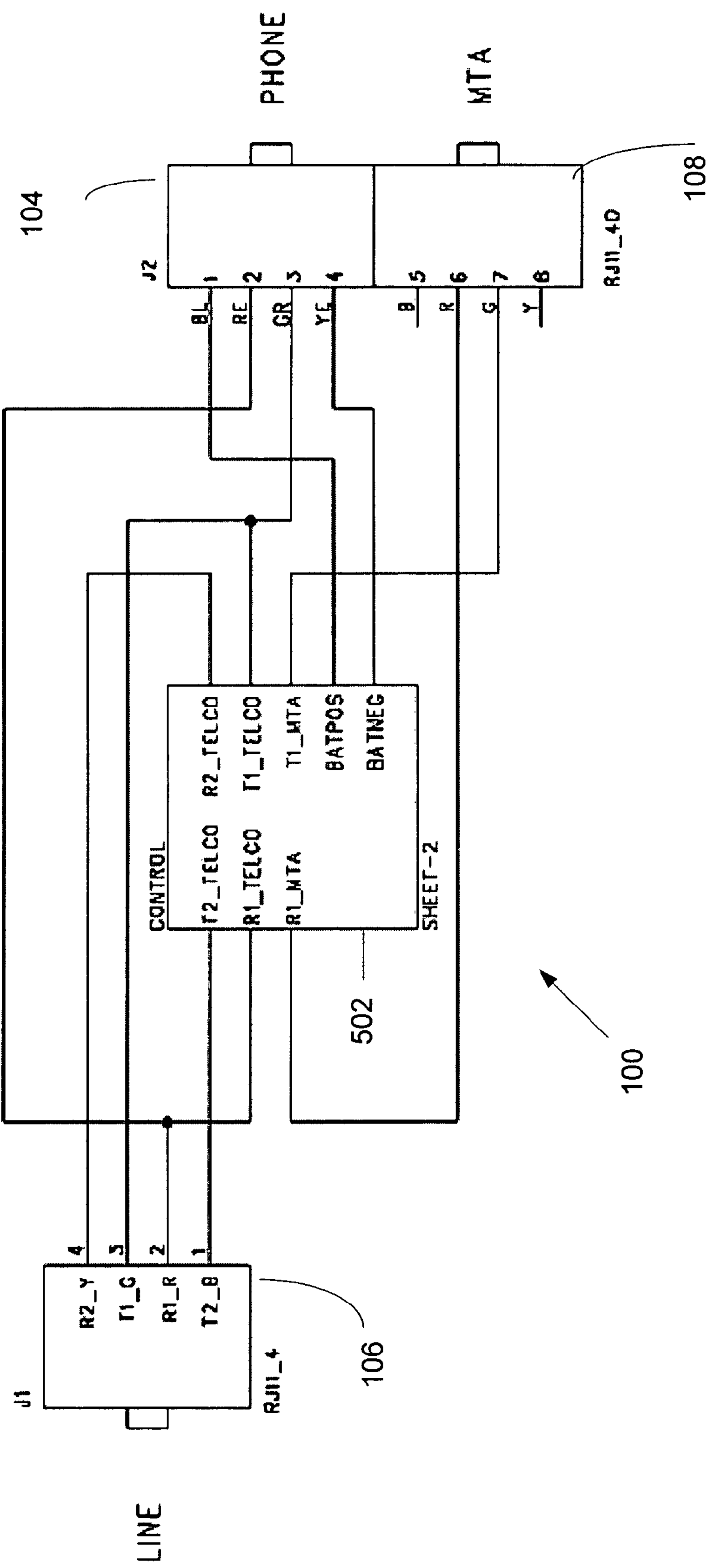
FIG. 5 is a circuit diagram showing a construction of the digital telephone switch of FIGS. 1 and 2.
Figures 6, 6A:
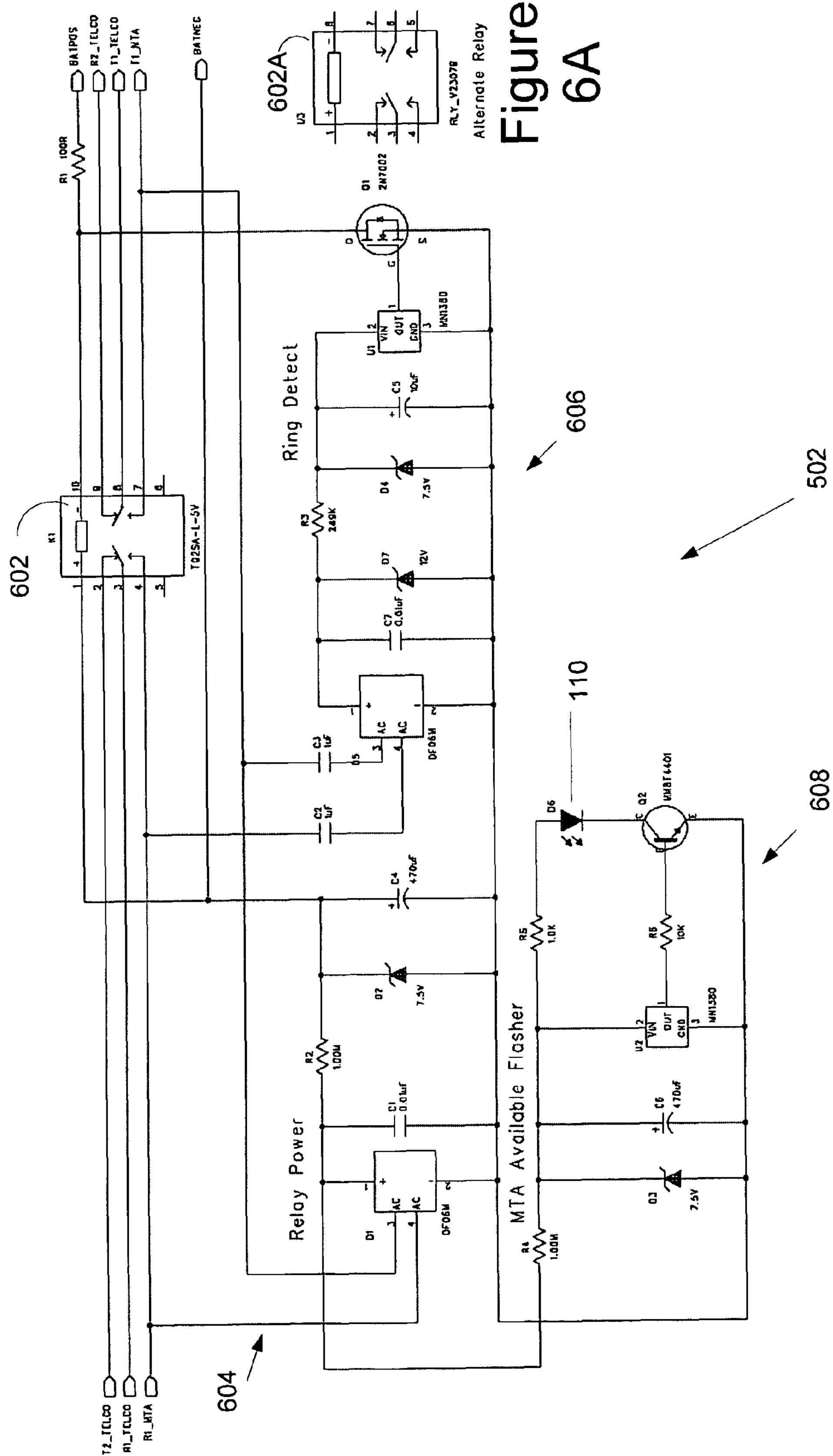
FIG. 6 is a circuit diagram showing a construction of the control block of FIG. 5.
FIG. 6A is a circuit diagram showing an alternative relay which may be used in the control block of FIG. 6.

An implementation of the digital telephone connector 100 of the first preferred embodiment will be explained in greater detail with reference to the circuit diagrams of FIGS. 5 and 6. FIG. 5 shows the manner in which the ports 104, 106, 108 are connected to one another and to a control block 502. As shown in FIG. 6, the control block 502 is configured to have a relay 602 for implementing the switching elements 232, 234 of FIG. 2, a relay power section 604 for powering the relay 602, a ring detect section 606 for detecting a ring on the MTA, and an MTA-available flasher section 608 for actuating the LED 110. The relay 602 may be replaced with the relay 602A of FIG. 6A.

The specifications of the digital telephone switch 100 according to the first preferred embodiment are as follows:

TABLE I

| Parameter | Specification |
|---|---|
| Implementation requirements | |
| Cross connect at telephone company demarcation | See FIG. 3 and accompanying disclosure. |
| Input | |
| DC line voltage | 22-60 V DC on red and green lines 224, 226 of port 108 |
| Startup current | 100 μÅ maximum |
| Power-up time | 2.5 minutes maximum |
| Quiescent current | 50 μÅ maximum |
| Operation | |
| MTA ring detection | 40 VAC to 115 VAC |
| Switch to MTA | Within 0.5-2 cycles of ring tone |
| MTA in-service indication | Flashing red LED 110 |
| Switch reset | 9 V DC applied across black and yellow lines 202, 208 of port 104 |
| Other | |
| Temperature | −40° C. to +60° C. |

The digital telephone switch 100 requires thirty seconds of charge-up time off of the MTA 250 before it can become operational. As noted above, that time period is a matter of design choice.

A second preferred embodiment will now be set forth. As explained above, the second preferred embodiment, or the "intercom" embodiment, allows two-way switching. That is, the switch according to the second preferred embodiment switches back to the ILEC line when a ring is detected on the ILEC line or when the switch detects that the MTA has lost power or is otherwise unavailable. The second preferred embodiment is based on the first preferred embodiment. Therefore, the disclosure relating to the first preferred embodiment applies with equal force to the second preferred embodiment wherever appropriate.

Figure 7:
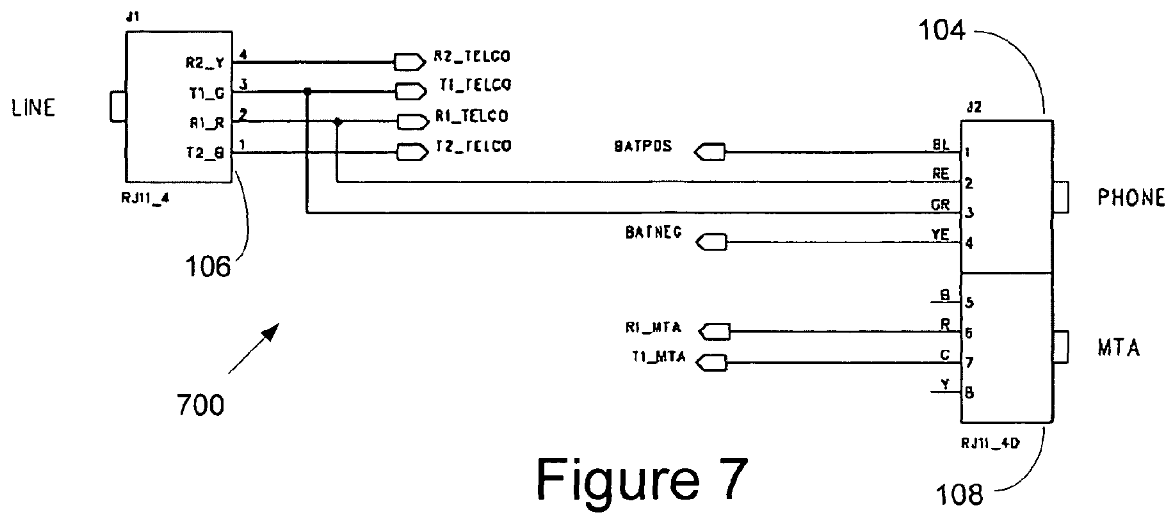
FIG. 7 is a schematic diagram showing an overview of the digital telephone switch according to the second preferred embodiment.
Figure 8:
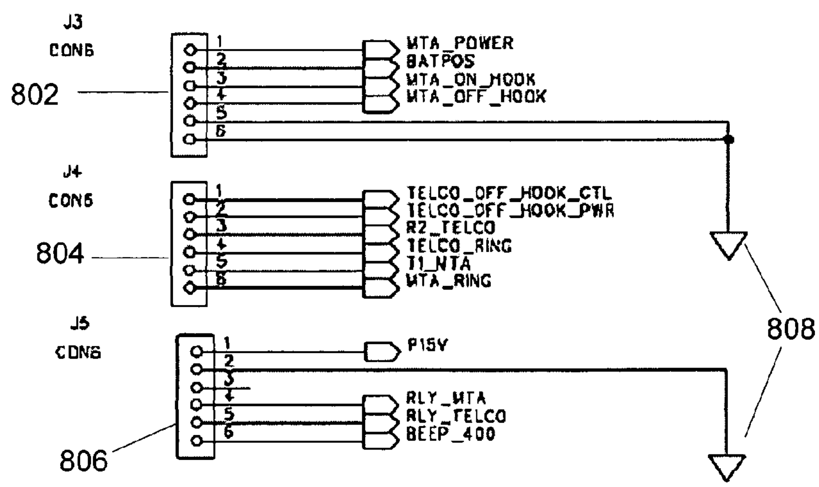
FIG. 8 is a wiring diagram showing connections from three internal connectors in the digital telephone switch of FIG. 7.

FIG. 7 shows an overview of the switch 700 according to the second preferred embodiment. For simplicity, only the ports 104, 106, 108 are shown. As shown, there is a hard-wired connection between the green and red lines of the ports 104 and 106. The remaining lines are identified by the signals which they carry, which show the interconnection of the various elements shown in FIGS. 7-13. Similarly, FIG. 8 shows three internal connectors J3 802, J4 804, and J5 806, with the lines identified by the signals which they carry, except for those lines which are unused or connected to ground 808.

Figure 9:
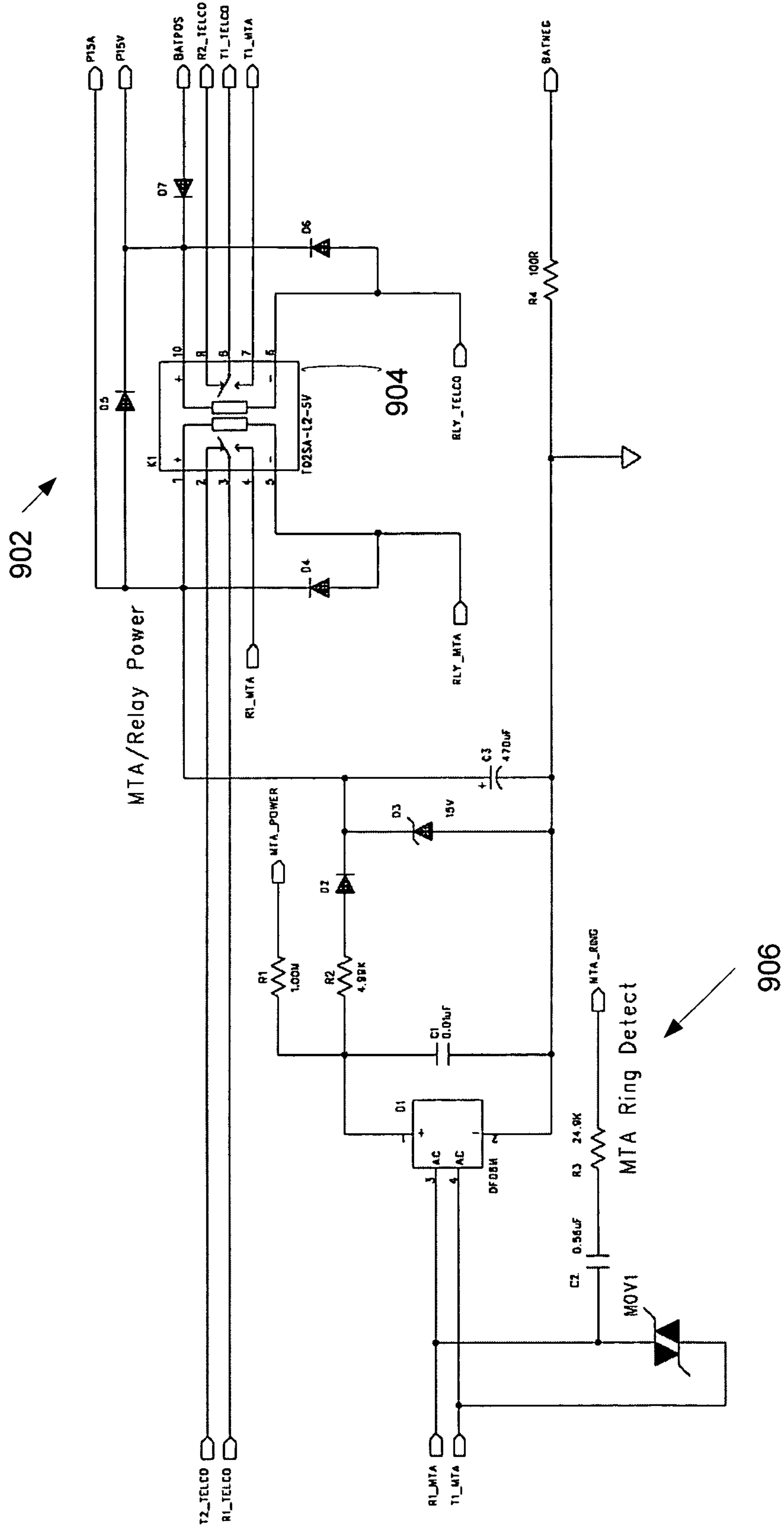
FIGS. 9-13 are circuit diagrams showing various sections of the digital telephone switch of FIG. 7.
Figure 10:
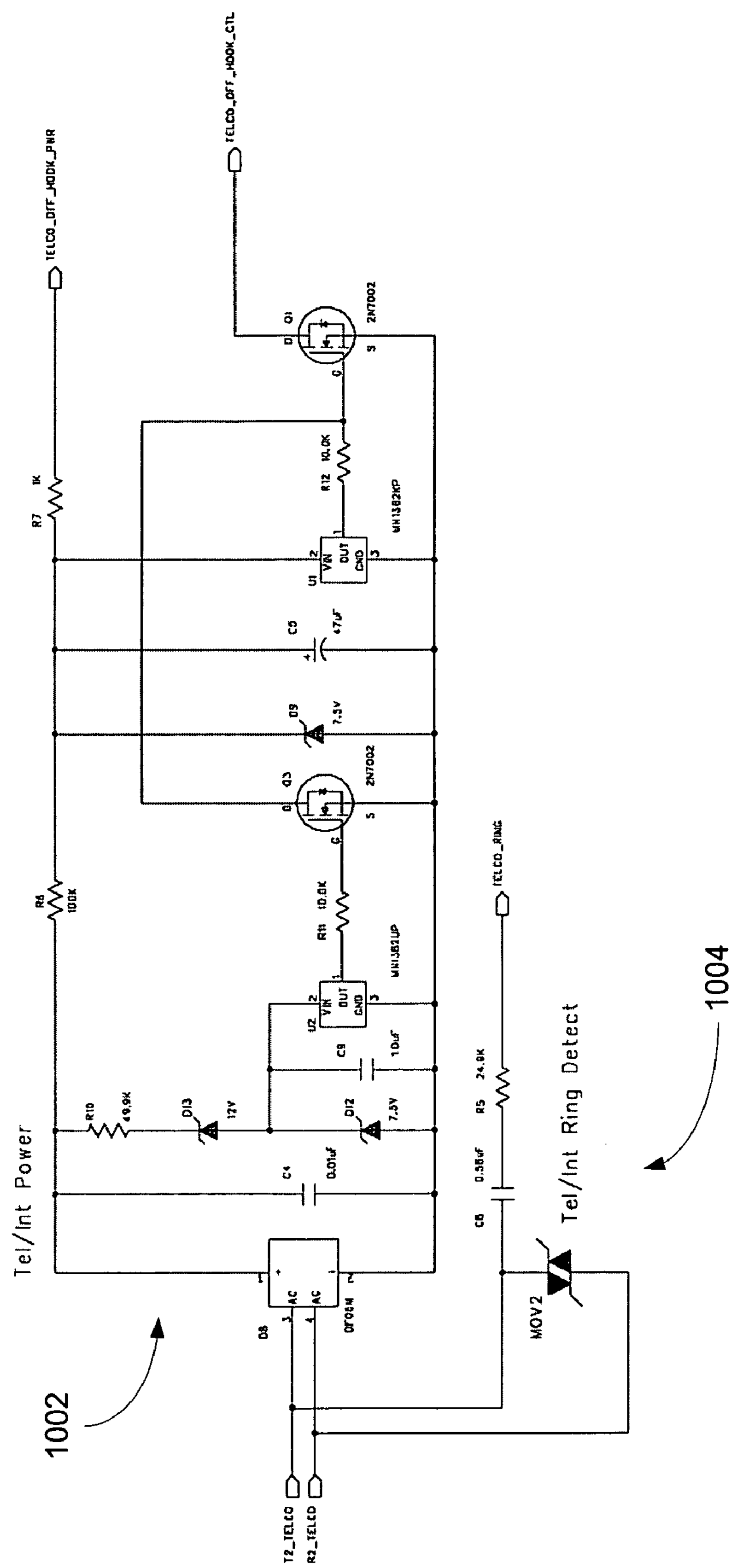
Figure 11:
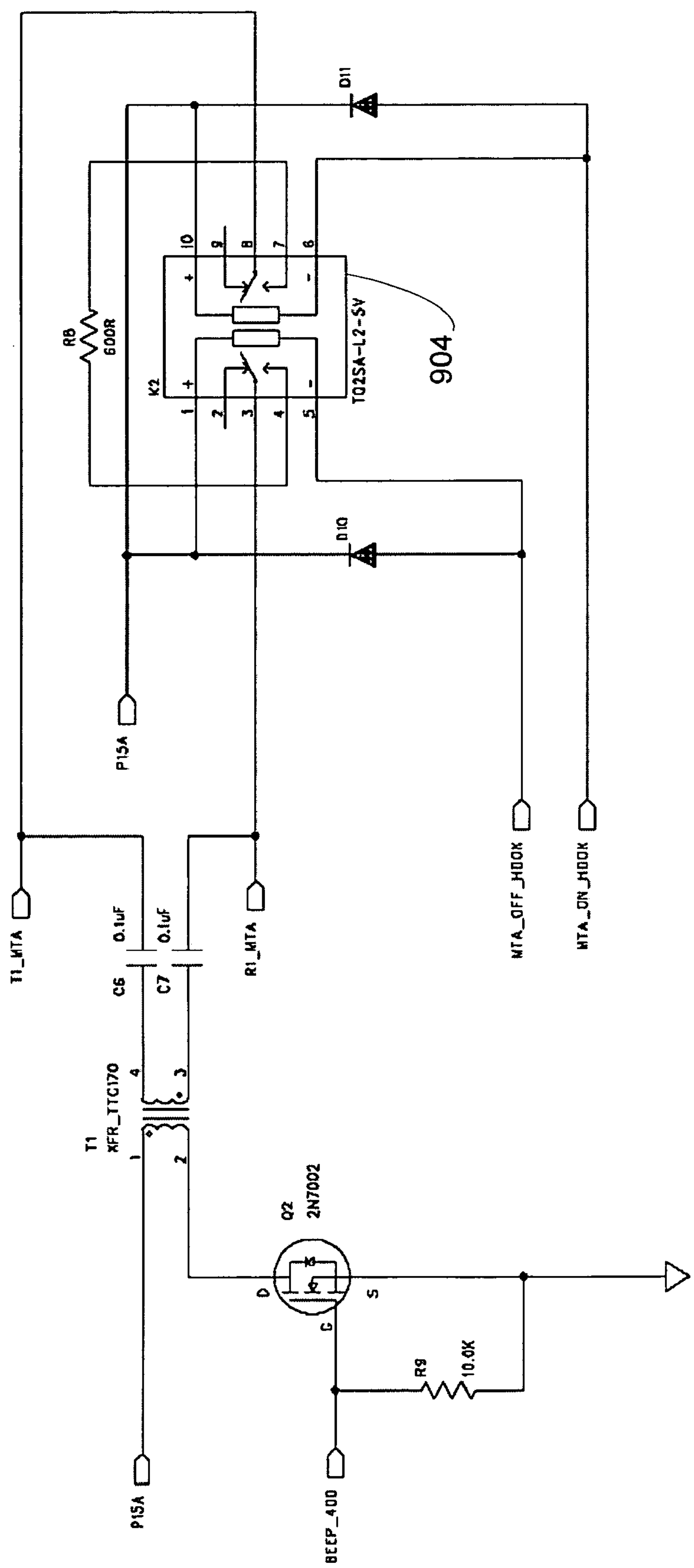
Figure 12:
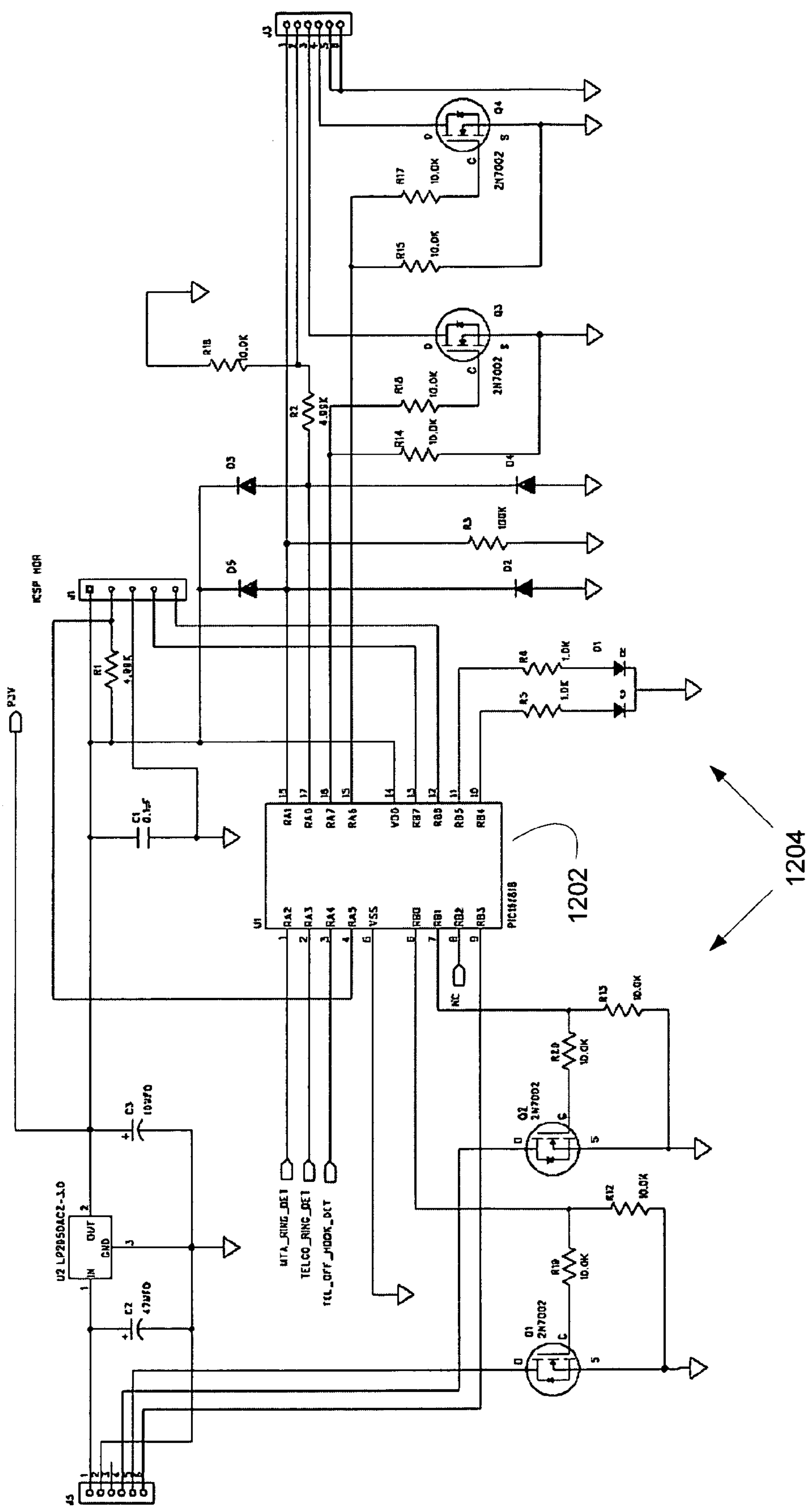
Figure 13:
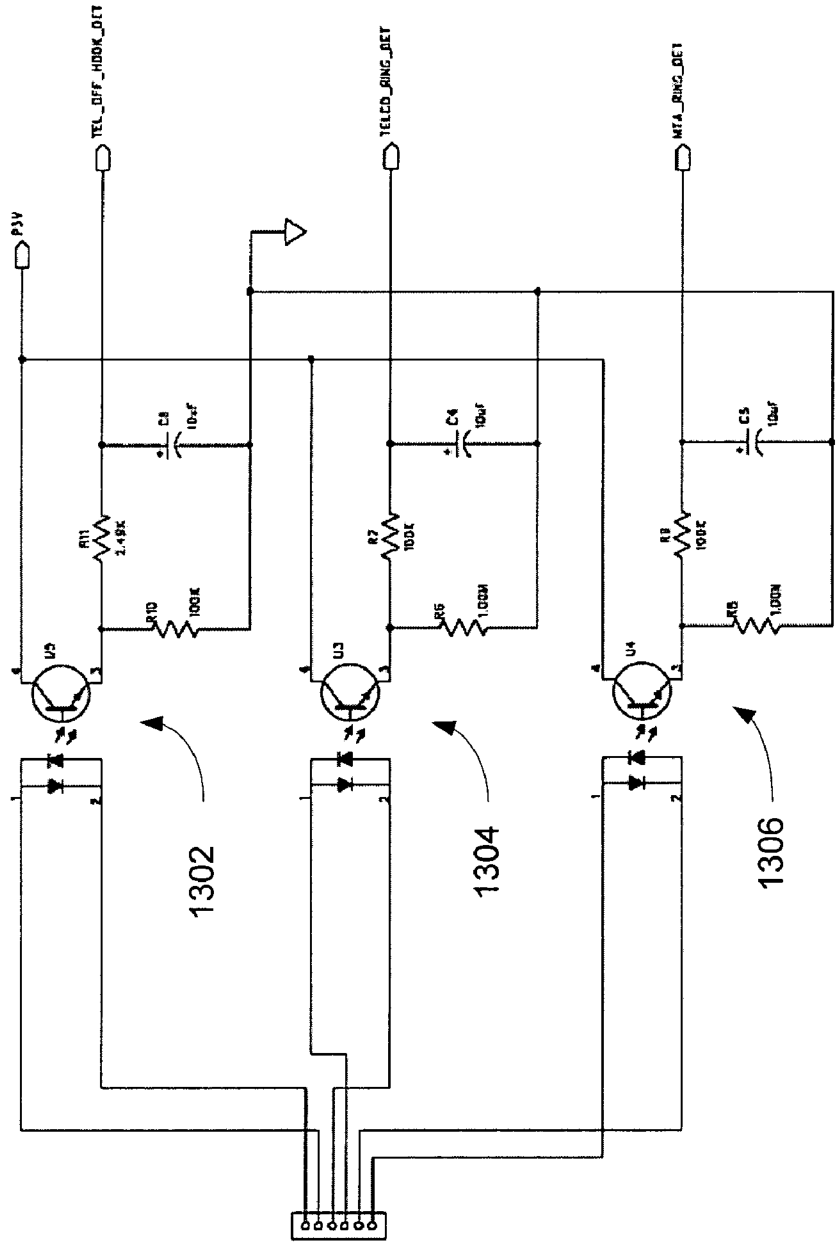

The circuitry for the operation of the switch 700 will be disclosed with reference to FIGS. 9-13. FIG. 9 shows the MTA/relay power section 902, with the relay 904, and the MTA ring detect section 906. FIG. 10 shows the ILEC/intercom power section 1002 and the ILEC/intercom ring detection section 1004. FIG. 11 shows the MTA control section 1102, again with the relay 904. FIG. 12 shows the microcontroller 1202 and associated circuitry 1204. FIG. 13 shows the ILEC off hook detection section 1302, the ILEC ring detection circuit 1304, and the MTA ring detection circuit 1306.

Figure 14:
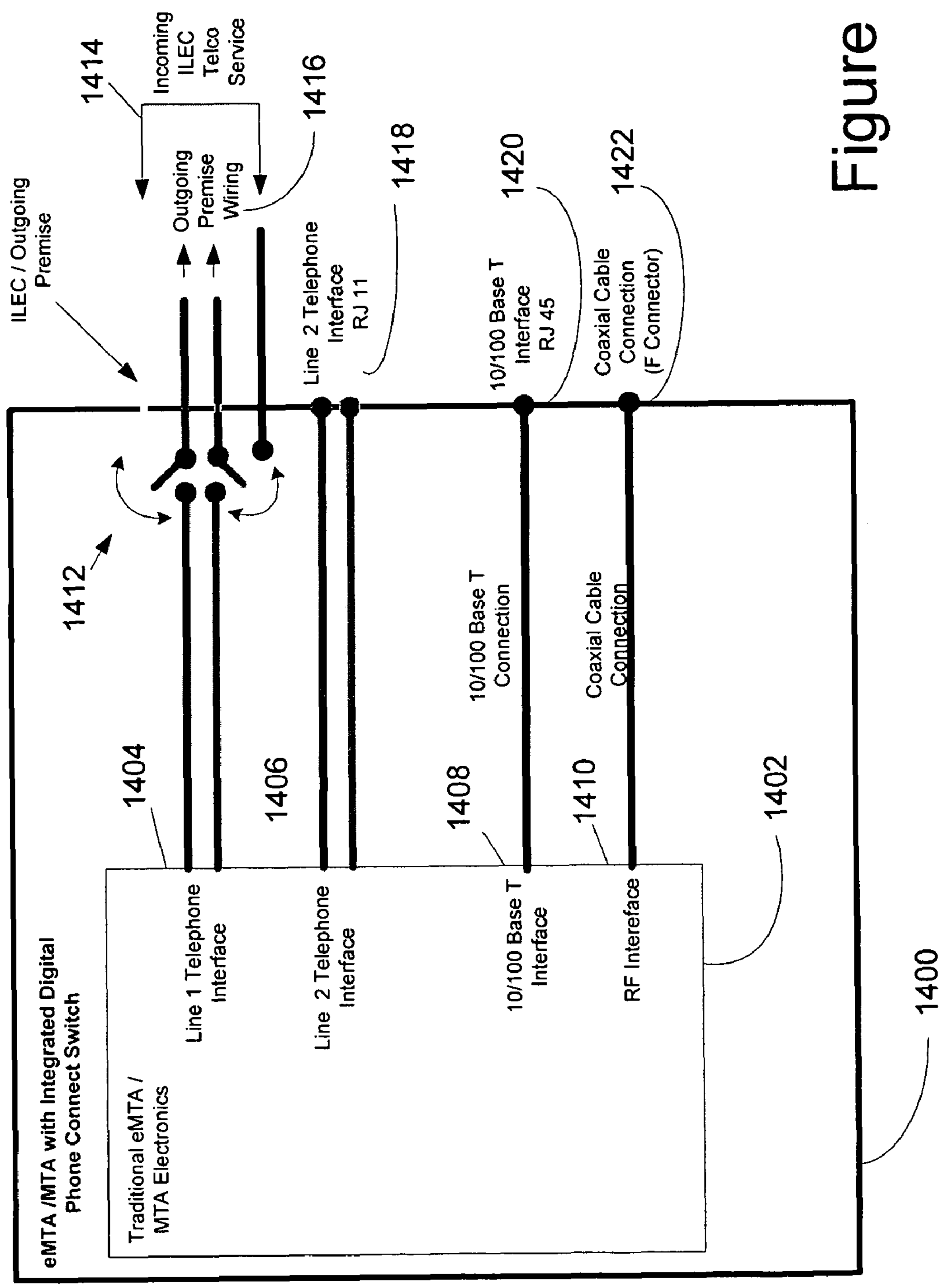
FIG. 14 is a high-level block diagram showing a multimedia terminal adapter or embedded multimedia terminal adapter in which the switch of either of the preferred embodiments is embedded.

As noted above, either of the two preferred embodiments can be integrated into an MTA/eMTA (enhanced MTA). An example is shown in FIG. 14, although other implementations can be realized instead. As shown, an MTA/eMTA 1400 includes traditional MTA/eMTA electronics 1402 with a line 1 telephone interface 1404, a line 2 telephone interface 1406, a 10/100 Base T interface 1408 and an RF interface 1410. The line 1 telephone interface 1404 is connected via a switch 1412, like any of the variations described above, to incoming ILEC telephone service wiring 1414 and outgoing premises wiring 1416. The line 2 telephone interface 1406 is connected to an RJ 11 jack 1418. The 10/100 Base T interface is connected to an RJ 45 jack 1420. The RF interface is connected to a coaxial cable connection (F connector) 1422.

More generally, an MTA/eMTA with an integrated telephone switch would include the following: a) a connection interface on the MTA/eMTA for the incoming ILEC telephone service; b) at least one, but maybe more, premise wiring interfaces, at least one of which would be connected to the internal switch so that either the ILEC or the MTA supplied phone service can be switched onto it; and c) a switch designed into the unit to accommodate switching the premise wiring interface between the ILEC and the MTA. In an MTA installation, it is not necessary for the switch to be triggered on the ring signal of the MTA/eMTA. Rather, it could be controlled by some other mechanism within the MTA. eg. a control signal.

While two preferred embodiments have been set forth in detail above, those skilled in the art who have reviewed the present disclosure will readily appreciate that other embodiments can be achieved within the scope of the present invention. For example, numerical values are illustrative rather than limiting. Also, the digital telephone switch can be reconfigured to remove the need for the ILEC cross connection by reconfiguring its internal connections, adding a port, or both. Furthermore, the digital telephone switch can operate, or be configured to operate, with any two types of telephone service, not simply the two described. Moreover, if it is not desired to connect the digital telephone switch to both the CPE and a local telephone through separate ports, the port 104 can be eliminated. Also, as noted above, the switch in either of the preferred embodiments can be controlled to switch over in response to a signal other than an incoming ring; an example of such a signal is a signal received from a remote operator over that remote operator's telephone keypad. Therefore, the present invention should be construed as limited only by the appended claims.

We claim:

1. A switching device for switching a subscriber's telephone service from a first telephone service to a second telephone service, the switching device comprising:

a first plurality of lines for connecting the switching device to the first telephone service;

a second plurality of lines for connecting the switching device to the second telephone service;

a third plurality of lines for connecting the switching device to customer premises telephone equipment;

a switch, triggered by a control signal, for switching the switching device from a first connection between the first and third pluralities of lines to a second connection between the second and third pluralities of lines, thereby switching the customer premises telephone equipment from the first telephone service to the second telephone service; and a reset device configured to detect a reset voltage present on one of the first, second, and third plurality of lines, and to reset the switch to the first connection if the reset voltage is detected.

2. The switching device of claim 1, wherein the control signal comprises an initial ring of the second telephone service.

3. The switching device of claim 1, wherein the control signal comprises a control signal transmitted to the switching device by an external operator.

4. The switching device of claim 1, further comprising an external indicator for indicating when the second telephone service is in service.

5. The switching device of claim 1, further comprising:

a first port for providing access to the first and third pluralities of lines; and a second port for providing access to the second plurality of lines.

6. The switching device of claim 5, wherein the first and second ports comprise modular jacks.

7. The switching device of claim 5, wherein the first port is configured to connect to the first telephone service by way of a cross connect wiring.

8. The switching device of claim 5, further comprising:

a fourth plurality of lines for connecting the switching device to a local telephone, the fourth plurality of lines being hard-wired to the third plurality of lines; and a third port for providing access to the fourth plurality of lines.

9. The switching device of claim 1, wherein the switch, when triggered by a second control signal, switches the switching device from the second connection back to the first connection.

10. The switching device of claim 9, wherein the second control signal comprises a ring of the first telephone service.

11. The switching device of claim 9, wherein the second control signal comprises a control signal transmitted to the switching device by an external operator.

12. The switching device of claim 1, further comprising connectors for connecting the first, second and third pluralities of lines within a network interface device of a telephone carrier.

13. The switching device of claim 1, further comprising a case for outdoor installation of the switching device.

14. The switching device of claim 1, further comprising a case for installation of the switching device as a wall plate.

15. A method for switching a subscriber's telephone service from a first telephone service to a second telephone service, the method comprising:

(a) providing a switching device comprising:

a first plurality of lines for connecting the switching device to the first telephone service;

a second plurality of lines for connecting the switching device to the second telephone service;

a third plurality of lines for connecting the switching device to customer premises telephone equipment;

a switch, triggered by a control signal, for switching the switching device from a first connection between the first and third pluralities of lines to a second connection between the second and third pluralities of lines, thereby switching the customer premises telephone equipment from the first telephone service to the second telephone service; and a reset device configured to detect a reset voltage present on one of the first, second, and third plurality of lines, and to reset the switch to the first connection if the reset voltage is detected;

(b) connecting the first plurality of lines to the first telephone service;

(c) connecting the second plurality of lines to the second telephone service;

(d) connecting the third plurality of lines to the customer premises telephone service; and (e) receiving the control signal and triggering the switch.

16. The method of claim 15, wherein the control signal comprises an initial ring of the second telephone service.

17. The method of claim 15, wherein the control signal comprises a control signal transmitted to the switching device by an external operator.

18. The method of claim 15, further comprising resetting the switch to the first connection.

19. The method of claim 15, wherein:

the first telephone service is an analog telephone service; and the second telephone service is a digital telephone service.

20. The method of claim 19, wherein the second telephone service is a cable telephone service.

21. The method of claim 20, wherein step (c) comprises connecting the second plurality of lines to a multifunction terminal adapter.

22. The method of claim 15, wherein steps (b)-(d) are performed using modular jacks.

23. The method of claim 15, wherein step (b) comprises performing a cross connect wiring at a location where the first telephone service enters the subscriber's premises.

24. The method of claim 15, further comprising (f) receiving a second control signal and triggering the switch to switch from the second connection back to the first connection.

25. The method of claim 24, wherein the second control signal comprises a ring of the first telephone service.

26. The method of claim 24, wherein the second control signal comprises a control signal transmitted to the switching device by an external operator.

27. The method of claim 15, wherein step (a) comprises installing the switching device in a network interface device of a telephone carrier.

28. The method of claim 15, wherein step (a) comprises providing the switching device as a component in a multimedia terminal adapter or an embedded multimedia terminal adapter.

29. A switching device for switching a subscriber's telephone service from a first telephone service to a second telephone service, while continuing to allow the subscriber to be called over the first telephone service, the switching device comprising:

first plurality of lines for connecting the switching device to the first telephone service;

a second plurality of lines for connecting the switching device to the second telephone service;

a third plurality of lines for connecting the switching device to customer premises telephone equipment;

a switch for (i) switching the switching device, when triggered by a first control signal, from a first connection between the first and third pluralities of lines to a second connection between the second and third pluralities of lines, thereby switching the customer premises telephone equipment from the first telephone service to the second telephone service, and (ii) switching the switching device, when triggered by a second control signal after the switching device has been switched to the second connection, from the second connection back to the first connection, thereby switching the customer premises telephone equipment back to the first telephone service to allow the subscriber to receive a call on the first telephone service; and call-waiting circuitry configured to a) detect a ring signal on one of the first and second plurality of lines that is not connected to the third plurality of lines, b) generate a call-waiting signal in response to detection of the ring signal, and c) communicate the call-waiting signal to the third plurality of lines.

30. The switching device of claim 29, wherein the first control signal comprises an initial ring of the second telephone service.

31. The switching device of claim 30, wherein the second control signal comprises a ring of the first telephone service.

32. The switching device of claim 31, wherein, when the call on the first telephone service is terminated, the switch switches the switching device from the first connection to the second connection.

33. The switching device of claim 31, wherein the switch comprises an element for maintaining a connection to the second telephone service so that the subscriber can receive the call on the first telephone service without terminating use of the second telephone service.

34. The switching device of claim 29, wherein the switch is locked in the second connection in response to a third control signal communicated over one of the first and second plurality of lines.

35. A multimedia terminal adapter comprising:

a first telephone connector for connecting the multimedia terminal adapter to a first telephone service;

a second telephone connector for connecting the multimedia terminal adapter to customer premises telephone equipment;

multimedia terminal adapter circuitry comprising a digital network interface, a telephone interface, and circuitry for allowing a second telephone service to operate between the digital network interface and the telephone interface; and a switching device for switching a subscriber's telephone service from the first telephone service to the second telephone service, the switching device comprising:

a first plurality of lines for connecting the switching device to the first telephone connector;

a second plurality of lines for connecting the switching device to the telephone interface of the multimedia terminal adapter circuitry;

a third plurality of lines for connecting the switching device to the second telephone connector;

a switch, triggered by a control signal, for switching the switching device from a first connection between the first and third pluralities of lines to a second connection between the second and third pluralities of lines, thereby switching the customer premises telephone equipment from the first telephone service to the second telephone service; and a reset device configured to detect a reset voltage present on one of the first and second telephone connectors, and to reset the switch to the first connection if the reset voltage is detected.

36. The multimedia terminal adapter of claim 35, wherein the multimedia terminal adapter is an embedded multimedia terminal adapter.

* * * * *